(12) United States Patent
Stoll, Jr. et al.

(10) Patent No.: US 10,100,749 B1
(45) Date of Patent: Oct. 16, 2018

(54) THROTTLE DEVICES FOR RESTRICTING AIRFLOW TO MARINE ENGINES

(71) Applicant: Brunswick Corporation, Lake Forest, IL (US)

(72) Inventors: Jerry M. Stoll, Jr., Stillwater, OK (US); Mark A. McArtor, Stillwater, OK (US); Matthew S. Dawes, Stillwater, OK (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/588,938

(22) Filed: May 8, 2017

(51) Int. Cl.
  *F02D 9/10* (2006.01)
  *F02M 35/16* (2006.01)
  *B63H 21/14* (2006.01)

(52) U.S. Cl.
  CPC .............. *F02D 9/10* (2013.01); *B63H 21/14* (2013.01); *F02M 35/165* (2013.01)

(58) Field of Classification Search
  CPC ..... F02D 9/00; F02D 9/08; F02D 9/10; F02D 9/105; F02D 9/106; F02D 41/00; F02D 41/0002; F02M 35/165; B63H 21/14
  USPC ................. 123/336, 337, 361, 399
  See application file for complete search history.

(56) References Cited

U.S. PATENT DOCUMENTS

| | | | |
|---|---|---|---|
| 4,905,647 A * | 3/1990 | Kizer | F02D 9/104 123/337 |
| 5,394,846 A | 3/1995 | Jaeger | |
| 6,047,950 A * | 4/2000 | Pontoppidan | F02D 9/10 123/337 |
| 6,186,115 B1 * | 2/2001 | Nishimura | F02D 9/10 123/337 |
| 6,454,242 B1 * | 9/2002 | Garrick | F02D 9/104 123/337 |
| 6,602,099 B1 | 8/2003 | Loberger et al. | |
| 6,912,895 B1 | 7/2005 | Jaeger | |
| 6,959,915 B1 | 11/2005 | Wald et al. | |
| 7,195,055 B1 | 3/2007 | Jaeger | |
| 8,171,913 B2 * | 5/2012 | Sano | F02D 9/103 123/184.56 |
| 2005/0178355 A1 * | 8/2005 | Soshino | F02D 9/1045 123/337 |
| 2012/0318234 A1 * | 12/2012 | Dickinson | F02D 9/08 123/337 |

* cited by examiner

*Primary Examiner* — John Kwon
*Assistant Examiner* — Johnny H Hoang
(74) *Attorney, Agent, or Firm* — Andrus Intellectual Property Law, LLP

(57) ABSTRACT

A throttle device is for a marine engine. The throttle device has a throttle body with a through-bore for conveying air for combustion in the marine engine. A throttle plate is movable into and between a closed position in which the throttle plate prevents airflow through the through-bore and an open position in which the throttle plate allows the airflow through the through-bore. A restrictor device located is adjacent to the throttle plate. The restrictor device restricts the airflow through the through-bore when the throttle plate is moved out of the closed position.

14 Claims, 5 Drawing Sheets

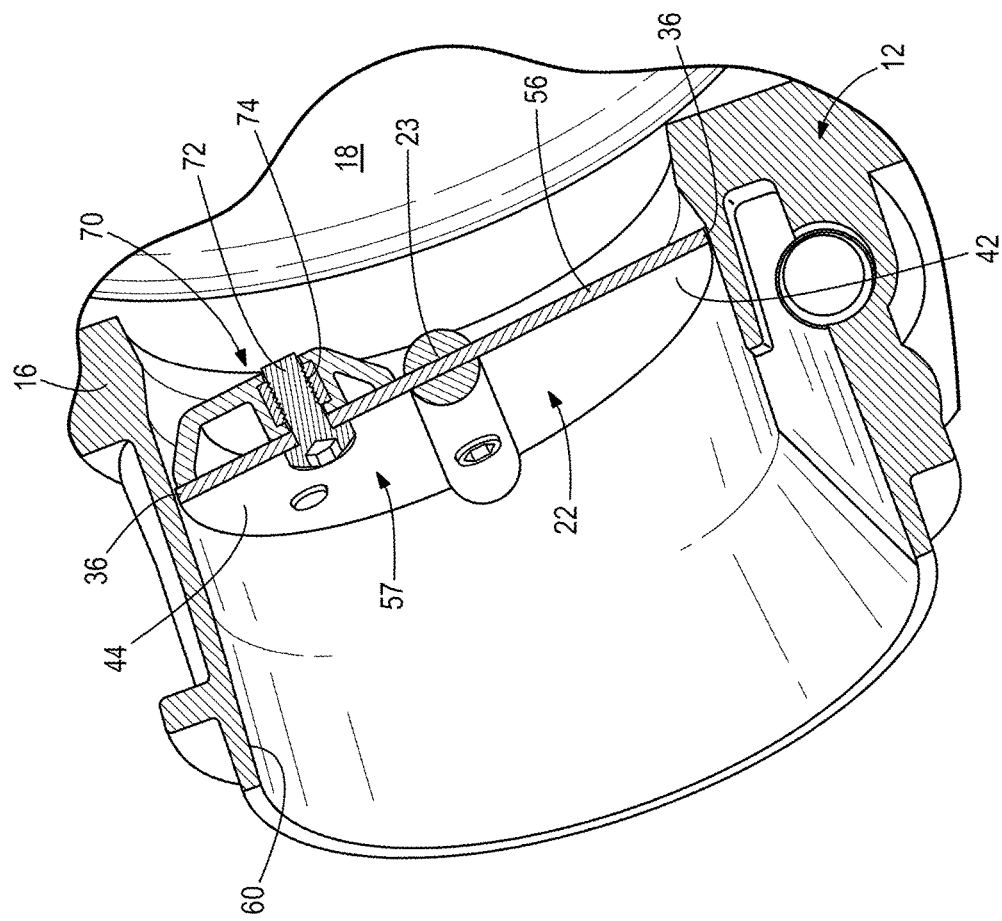
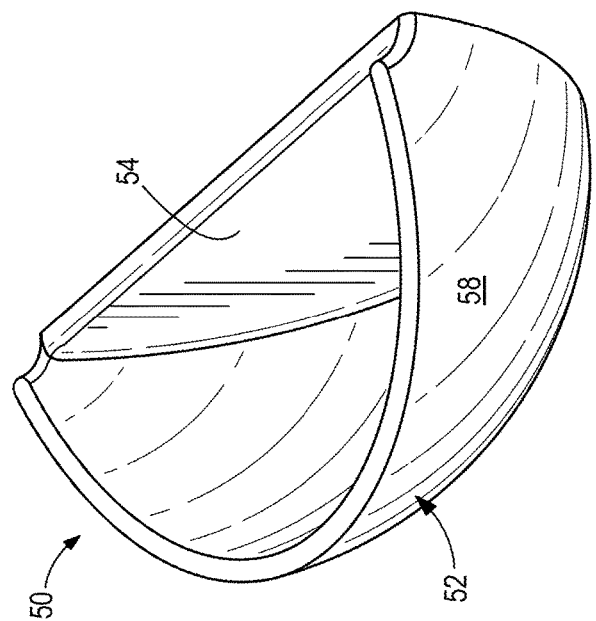

THROTTLE DEVICES FOR RESTRICTING AIRFLOW TO MARINE ENGINES

FIELD

The present disclosure relates to marine engines and particularly to throttle devices for marine engines.

BACKGROUND

The following U.S. Patents are incorporated herein by reference.

U.S. Pat. No. 6,959,915 discloses a block of material attached to a surface of a throttle plate in a throttle body assembly for the purpose of reducing sound emanating from the throttle plate region. The block of material has a first edge attached proximate to a perimeter of the throttle plate and second edge disposed more proximate the pivot axis of the throttle plate. The block of material has a central region and two distal regions. The distal regions are hyperbolic in shape and taper toward the outer edges of the block of material. Two holes are formed through the block of material.

U.S. Pat. No. 6,602,099 discloses an isolation mounting system for supporting a throttle body structure that is completely supported by an elastomeric support, but is held in non-contact association with an air intake manifold in order to effectively isolate the throttle body structure from vibration. The isolation protects delicate components contained within a component housing that is rigidly attached to the throttle body structure.

U.S. Pat. No. 5,394,846 discloses a dual bore throttle body assembly for a marine engine. The assembly includes a body having a pair of side-by-side bores, each of which is adapted to be enclosed by a flat throttle valve. A separate shaft is connected to each throttle valve and a throttle cable is connected to the shafts through a progressive linkage. The linkage is constructed such that only one of the valves is initially opened, and when that valve is approximately fifty percent open, the second valve is then opened. The speed of opening of the second valve is greater than that of the first valve so that both valves will reach the full opened position at the same instant. Each shaft is provided with a longitudinal slot which receives the respective throttle valve. The valves are secured within the slots by mechanical fasteners such as screws.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter. In certain examples disclosed herein, a throttle device is for a marine engine. The throttle device comprises a throttle body having a through-bore for conveying air for combustion in the marine engine. A throttle plate is movable into and between a closed position in which the throttle plate prevents airflow through the through-bore and an open position in which the throttle plate allows the airflow through the through-bore. A restrictor device located is adjacent to the throttle plate. The restrictor device restricts the airflow through the through-bore when the throttle plate is moved out of the closed position.

BRIEF DESCRIPTION OF THE DRAWINGS

Examples of apparatuses are described with reference to the following drawing figures. The same numbers are used throughout the drawing figures to reference like features and components.

FIG. 7 is a perspective view of another example of a restrictor device for the throttle device shown in FIG. 5.

FIG. 8 is a perspective view of another example of a throttle device and restrictor device, showing the throttle valve in a closed position.

DETAILED DESCRIPTION OF THE DRAWINGS

Through research and development, the present inventors have determined that manufacturers of marine engines, including but not limited to stern drive and inboard applications, often use the same displacement engine for multiple variations having different respective horsepower ratings. Additionally, different varieties of throttle devices capable of operating in a marine environment are not readily available; so many differently sized engines often share the same throttle body design.

To achieve different airflow requirements on restricted, relatively lower horsepower versions of marine engines, it is known to install restrictor plates upstream of the throttle body—to thereby reduce peak air flow. However when lower horsepower engines are fitted with a relatively large diameter throttle body and a relatively small diameter restrictor plate, throttle resolution can be negatively affected. That is, peak air flow and consequently peak engine power can be attained at lower throttle opening positions as a result of the restrictor plate. This can give the operator a negative perception of engine performance because the last portion of travel of the throttle valve will not yield a perceivable increase in speed.

Additionally, the present inventors have found that many conventional restrictor plates are too easily removed by the end user, which can adversely affect marine engine performance. This is done for example in an attempt to achieve higher airflow and horsepower.

Through research and development, the present inventors have endeavored to provide improved throttle devices that overcome the above-noted issues.

Figure 1:
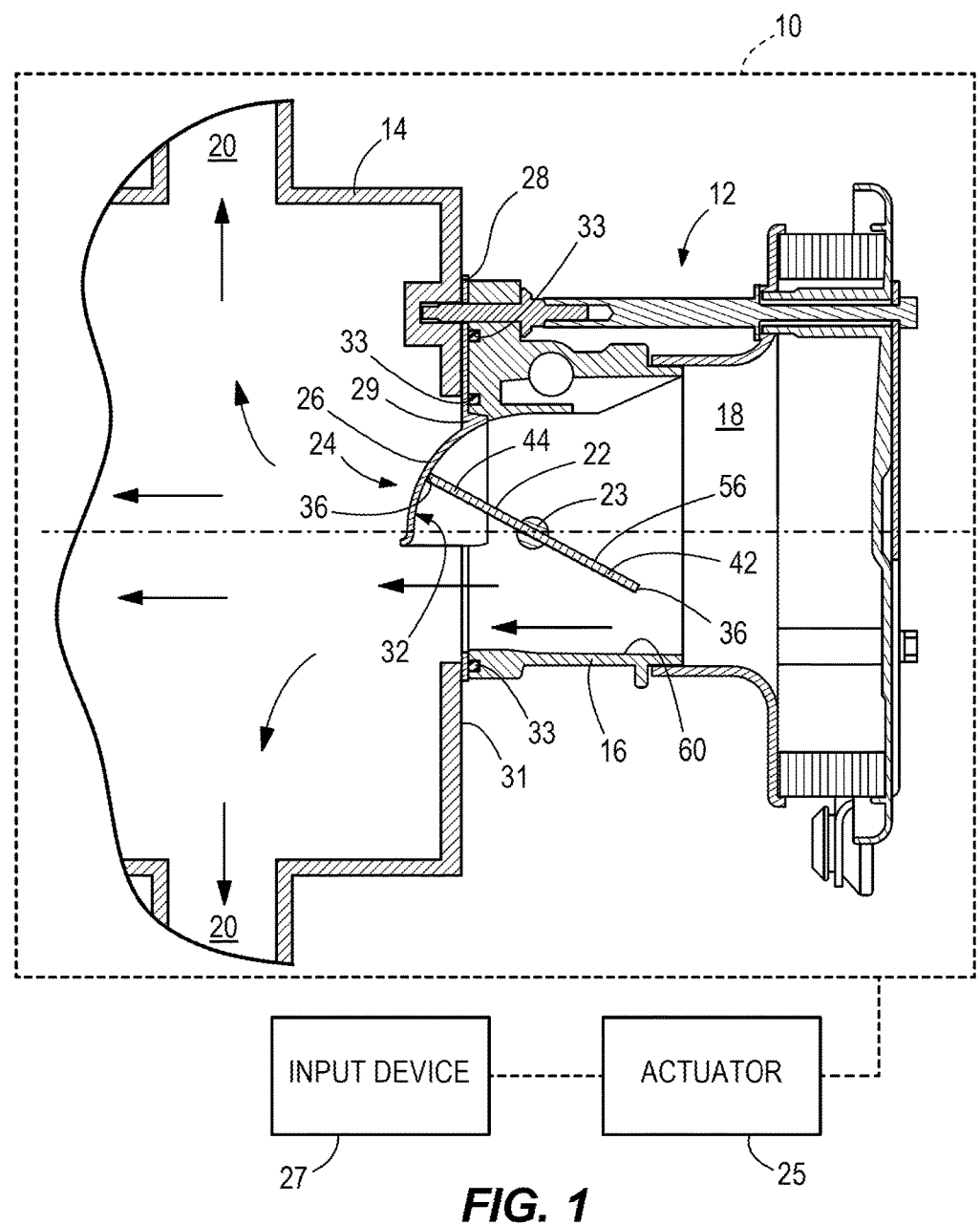
FIG. 1 is a cross-sectional view of a throttle device connected to an intake manifold for a marine engine.

FIG. 1 schematically depicts a marine engine (see dashed line 10) for propelling a marine vessel in water. The marine engine 10 can be part of a stern drive arrangement; however this is merely one example and the concepts of the present disclosure are applicable to other marine engine arrangements, including for example other inboard arrangements and outboard arrangements. The marine engine 10 has a throttle device 12 that is configured to control inflow of air to an intake manifold 14 for combustion in the marine engine 10. The throttle device 12 has a throttle body 16 that defines a through-bore 18 for conveying air to the marine engine 10 via the intake manifold 14. The intake manifold 14 has one or more outlets 20 for distributing the intake air to respective cylinders in the marine engine 10. The configuration of the intake manifold 14 can vary from what is shown, and can include only one outlet 20 or more than one outlet 20, for example four, six or eight outlets 20.

Figure 2:
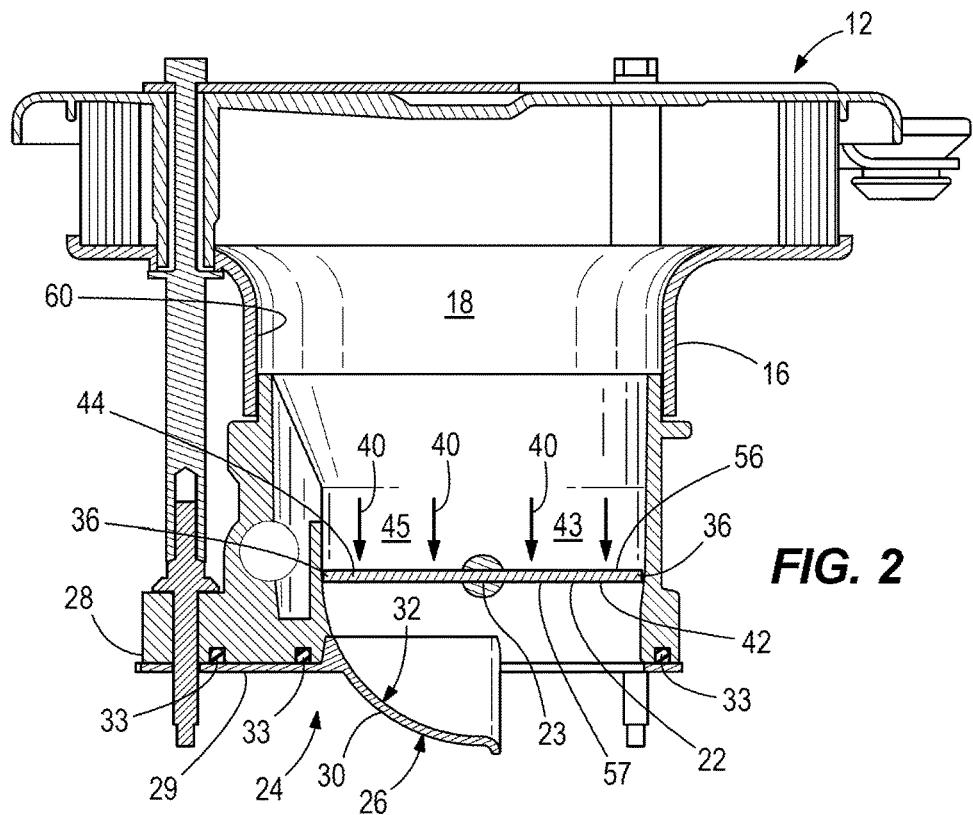
FIG. 2 is a cross-sectional view of the throttle device in FIG. 1, showing a throttle valve in a closed position.
Figure 3:
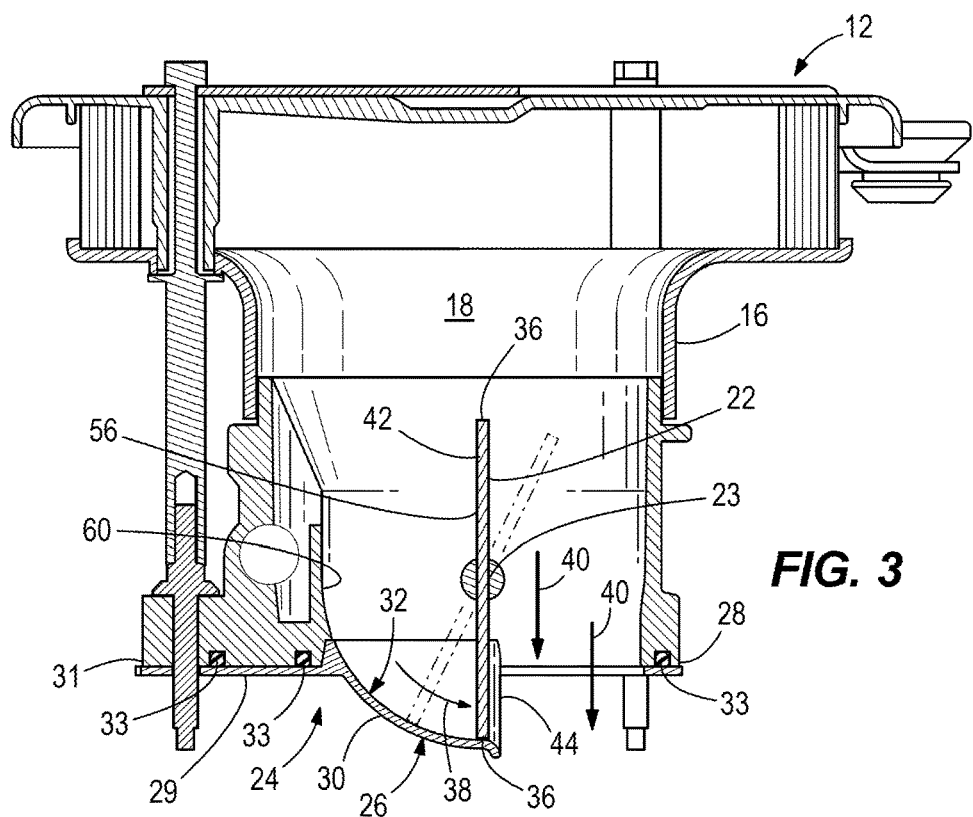
FIG. 3 is a cross-sectional view of a throttle device in FIG. 1, showing the throttle valve in an open position.
Figure 4:
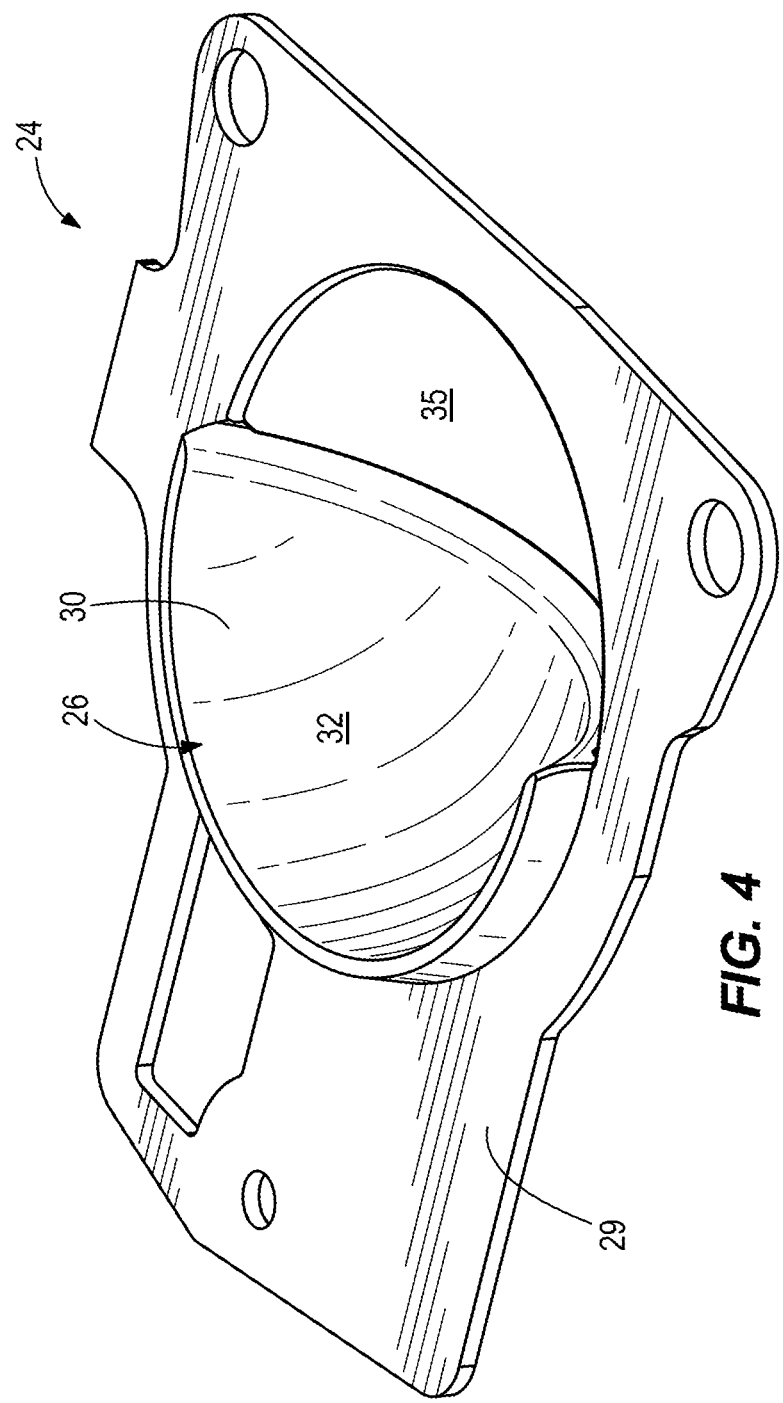
FIG. 4 is a perspective view of an example restrictor device for the throttle device in FIG. 1.

Referring to FIGS. 1-3, the throttle device 12 has a throttle plate 22 that is disposed in the through-bore 18 and pivotable about a central pivot axis 23. The throttle plate 22 is movable into and between a closed position (see FIG. 2) in which the throttle plate 22 blocks and therefore prevents airflow through the through-bore 18 and an open position (see FIG. 3) in which the throttle plate 22 opens and therefore allows the airflow through the through-bore 18. In the illustrated example, the throttle plate 22 is pivotable through ninety degrees of rotation into and between the open and closed positions. FIG. 1 shows the throttle plate 22 in a position that is between the closed and open positions. A conventional actuator mechanism 25 is configured to pivot the throttle plate 22. The actuator mechanism 25 can be any type of actuator mechanism, for example an electrical actuator and/or a mechanical actuator, which are well known in the art and thus not further described herein. A conventional user input device 27, for example at the helm of the marine vessel, is configured to control the actuator mechanism 25 so that the operator can control the position of the throttle plate 22 via the user input device 27. The type and configuration of user input device 27 can vary and for example can include a manual lever, joystick, touchscreen, and/or any other device for inputting a user throttle command. The actuator mechanism 25 and user input device 27 are conventional features for controlling the throttle of a marine engine and thus, for brevity, are not further described herein.

The throttle plate 22 has radially outer, perimeteral edge 36 that is located adjacent to the inner radial walls 60 of the throttle body 16 when the throttle plate 22 is in the closed position (see FIG. 2). In this example, the through-bore 18 has a radial cross-section that is generally circular and the throttle plate 22 has a diameter that is sized slightly smaller than the radial cross-section of the through-bore 18 so that the throttle plate 22 blocks the airflow when it is in the closed position. The throttle plate 22 has a first half 42 that moves into the through-bore 18 (i.e., towards the direction of the airflow 40) when the throttle plate 22 is moved from the closed position to the open position. The throttle plate 22 has an opposite, second half 44 (i.e., on the opposite side of the pivot axis 23 relative to the first half 42) that moves towards the intake manifold 14 and marine engine 10 (i.e., with or in the direction of the airflow 40) when the throttle plate 22 is moved from the closed position into the open position. In the closed position (see FIG. 2), the first half 42 of the throttle plate 22 blocks the airflow through a first half 43 of the through-bore 18 and the second half 44 of the throttle plate 22 blocks the airflow through a second half 45 of the through-bore 18. The throttle plate 22 has an upstream side 56 that faces the airflow when the throttle plate 22 is in the closed position (see FIG. 2) and a downstream side 57 that faces away from the airflow when the throttle plate 22 is in the closed position.

Referring to FIGS. 1-4, according to the present disclosure, a restrictor device 24 is located adjacent to the throttle plate 22 and is configured to partially or entirely restrict the airflow past the throttle plate 22 in the above-noted second half 45 of the through-bore 18 when the throttle plate 22 is moved out of the closed position shown in FIG. 2. The configuration of the restrictor device 24 can vary from what is shown, and examples are described herein below with respect to the drawing figures.

In the example of FIGS. 1-4, the restrictor device 24 includes a plate 29 that is sandwiched between the downstream end 28 of the throttle body 16 and the upstream end 31 of the intake manifold 14. One or more seals 33 are disposed in grooves on the throttle body 16 and form an air-tight seal with the plate 29 so as to prevent leakage of air from the through-bore 18. The restrictor device 24 further includes a shield 26 having the shape of a spherical segment 30 with an inner surface 32 that faces the through-bore 18 and the above-noted second half 44 of the throttle plate 22. The shield 26 covers part (in this example, half) of a hole 35 (see FIG. 4) formed through the plate 29. The hole 35 has a diameter that generally corresponds to the diameter of the through-bore 18 in the throttle body 16. In this example, the shield 26 is shaped and sized so that half of the outer perimeteral edge 36 of the throttle plate 22 (i.e. the perimeteral edge 36 along the second half 44 of the throttle plate 22) travels along and remains adjacent to the inner surface 32 as the throttle plate 22 is moved out of (see the dashed lines and arrow 38 in FIG. 3) and back into the closed position shown in FIG. 2. The inner surface 32 is a uniformly curved surface and is located immediately downstream of the throttle plate 22 with respect to the direction of the airflow (see arrows 40 in the figures) through the through-bore 18. The restrictor device 24 is preferably configured to restrict the airflow through only the second half 45 of the through-bore 22.

The amount (degree) of the airflow that the restrictor device 24 restricts the airflow through the second half 45 of the through-bore 18 can be varied depending on the desired performance characteristics of the throttle device 12 and depending on various other factors such as the relative sizes of the throttle body 16, through-bore 18, intake manifold 14, and/or marine engine 10. That is, the restrictor device 24 can be configured (shaped and/or sized) to restrict all or only some portion of the airflow through the second half 45 of the through-bore 18. In example shown in FIGS. 1-4, the restrictor device 24 has the shield 26, with the above-noted spherical segment shape, which entirely prevents the airflow past the second half 45 of the through-bore 18 when the throttle plate 22 moved out of the closed position. In this example, the restrictor device 24 blocks about fifty percent of the airflow through the through-bore 18 when the throttle plate 22 is moved out of the closed position. When the throttle plate 22 is in a position that is between the open and closed positions, the restrictor device 24 continues to entirely block the airflow through the second half 45 of the through-bore 18; however the amount of the airflow that is allowed through the first half 43 of the through-bore 18 will vary depending upon the particular angle of the throttle plate 22 between the open and closed positions. In other examples, the shield 26 could be formed to cover less of the hole 35 and thus to only partially block the airflow through the second half 45 of the through-bore 18. In certain preferred examples, the shield 26 is shaped and sized based upon the above-noted engine and/or performance considerations so that advantageously, the entirety of throttle travel yields a perceivable increase in speed to the operator of the user input device 27.

Figure 5:
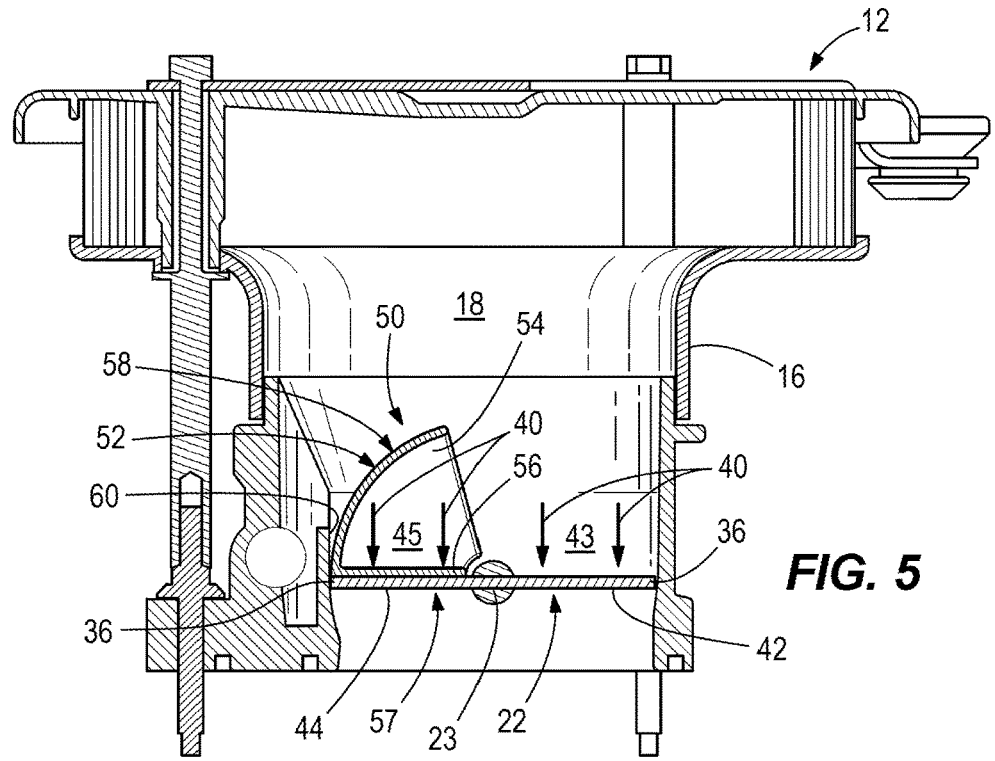
FIG. 5 is a cross-sectional view of another example of a throttle device, showing a throttle valve in a closed position.
Figure 6:
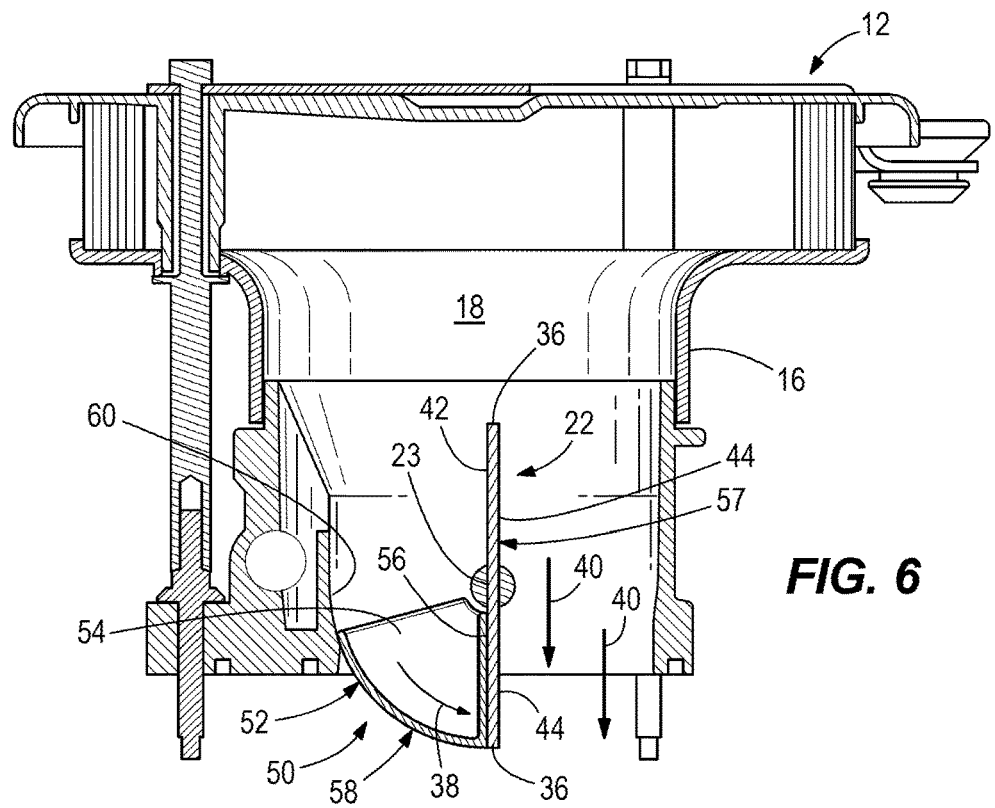
FIG. 6 is a cross-sectional view of the throttle device in FIG. 5, showing the throttle valve in an open position.

FIGS. 5-7 depict another example of a restrictor device 50 according to the present disclosure. FIGS. 5-7 also include corresponding reference numbers for similar structures shown in FIGS. 2-4 and described herein above. The restrictor device 50 is disposed on the upstream side 56 of the throttle plate 22 so that the restrictor device 50 is located between the throttle plate 22 and the upstream portions of the through-bore 18 when the throttle plate 22 is in the closed position. The restrictor device 50 is located on the second half 44 of the throttle plate 22. In FIGS. 5-7, the restrictor device 50 includes a shield 52 having a body 54 (i.e. base) that is mounted to the upstream side 56 of the second half 44 of the throttle plate 22. The shield 52 has a spherical segment shape with a curved outer surface 58 that travels along (i.e. remains adjacent to) an inner radial wall 60 of the through-bore 18 as the throttle plate 22 is moved into and between the closed position (FIG. 5) and the open position (FIG. 6). Similar to the above-described example, the shield 52 is shaped and sized to block all the airflow through the second half 45 of the through-bore 18 when the throttle plate 22 is moved out of the closed position shown in FIG. 5. Contrary to the above-described example, the restrictor device 50 is mounted on the throttle plate 22 and such that the throttle plate 22 is between the restrictor device 50 and the downstream intake manifold 14 when the throttle plate 22 is in the closed position. As described herein above, the shield 52 could be alternately shaped and/or sized to only partially block the airflow through the second half 45 of the through-bore 18. In certain preferred examples, the shield 52 advantageously can be shaped and sized so that the entirety of throttle travel yields a perceivable increase in speed to the operator of the user input device 27.

FIG. 8 depicts another example of a restrictor device 70 configured similar to the example shown in FIGS. 5-7, except the restrictor device 70 has the shape of a truncated cone. A fastener 72 extends through a central bore 74 in the restrictor device 70 and the throttle plate 22 so as to fasten the restrictor device 70 to the upstream side 56 of the second half 44 of throttle plate 22. The restrictor device 70 has the shape of an airfoil for blocking only some of the airflow through the second half 45 of the through-bore 18. Again, the shape and size of the restrictor device 70 can be varied based on the above described factors and to achieve the above-described performance advantages.

By implementing examples described herein above, it is possible to achieve variation in engine speed through an entire range of throttle control at the helm of the marine vessel. This allows the manufacturer to set peak horsepower of the marine engine by limiting the airflow while still maintaining throttle resolution through the entire opening range of the throttle. The shape of the restrictor device (shield, airfoil) can vary from what is shown in the examples and can be specially tailored (designed) to achieve consistent responsiveness at all throttle opening positions, thus improving responsiveness to the operator. In some examples, the concepts disclosed herein can advantageously provide a linear helm response for the operator with respect to throttle commands. Throttle resolution is maintained because the contour of the restrictor device entirely or partially blocks the airflow past one side of the throttle body opening (i.e., through-bore). This is a significant improvement over conventional restrictor plates, which do not achieve linearity because they do not restrict air flow at low throttle opening. Durability can also be improved by better controlling the airflow at lower throttle opening positions.

In certain examples, the specifically-shaped restrictor device can be installed downstream of the throttle body unit so that it would be more difficult to be removed by the operator. The shield can be shaped to follow the path of the lower side of the throttle blade as it is opened. This restricts the airflow by blocking (e.g. completely blocking) one side of the throttle opening. However it can be differently shaped so as to block any percentage of the throttle opening, based upon desired performance.

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A throttle device for a marine engine having an intake manifold for conveying air for combustion in the marine engine, the throttle device comprising:
    a throttle body having a through-bore for conveying the air to the intake manifold;
    a throttle plate that is movable into and between a closed position in which the throttle plate prevents airflow through the through-bore and an open position in which the throttle plate allows the airflow through the through-bore; and
    a restrictor device located between the throttle body and the intake manifold, wherein the restrictor device restricts the airflow through the through-bore to the intake manifold when the throttle plate is moved out of the closed position;
    wherein the throttle plate comprises a outer perimeteral edge, and wherein the restrictor device comprises a shield having an inner surface configured such that half of the throttle plate, along the outer perimeteral edge, remains adjacent to the inner surface as the throttle plate is moved out of and back into the closed position.

2. The throttle device according to claim 1, wherein the restrictor device prevents the airflow through only half of the through-bore when the throttle plate is in the open position.

3. The throttle device according to claim 1, wherein the restrictor device prevents fifty percent of the airflow through the through-bore when the throttle plate is in the open position.

4. The throttle device according to claim 1, wherein the throttle plate has a first half that moves into the through-bore towards the airflow when the throttle plate is moved from the closed position to the open position; wherein the first half of the throttle plate is located in a first half of the through-bore; wherein the throttle plate has an opposite, second half that moves towards the marine engine, away from the airflow, when the throttle plate is moved from the closed position into the open position; wherein the second half of the throttle plate is located in a second half of the through-bore; and wherein the restrictor device only restricts the airflow through the second half of the through-bore.

5. The throttle device according to claim 4, wherein the restrictor device restricts all of the airflow through the second half.

6. The throttle device according to claim 1, wherein the inner surface is a uniformly curved inner surface.

7. The throttle device according to claim 1, wherein the shield comprises a spherical segment.

8. The throttle device according to claim 1, wherein the shield is located immediately downstream of the throttle plate.

9. The throttle device according to claim 1, wherein the shield has a body that is mounted to the throttle plate.

10. The throttle device according to claim 1, wherein the throttle plate is pivotable through ninety degrees of motion and wherein the restrictor device prevents the airflow through the through-bore throughout the ninety degrees of motion.

11. An apparatus for conveying air for combustion in a marine engine, the apparatus comprising:
   an intake manifold;
   a throttle device coupled to the intake manifold, the throttle device comprising a throttle body having a through-bore for conveying air for combustion in the marine engine, and a throttle plate that is movable into and between a closed position in which the throttle plate prevents airflow through the through-bore and an open position in which the throttle plate allows the airflow through the through-bore; and
   a restrictor device located between the intake manifold and the throttle body, the restrictor device restricting the airflow when the throttle plate is moved out of the closed position, wherein the restrictor device comprises a plate that is sandwiched between the throttle body and the intake manifold, and a shield formed with the plate and having an inner surface that faces the throttle plate;
   wherein the shield is configured such that an outer perimeteral edge of the throttle plate travels adjacent to the inner surface of the shield as the throttle plate is moved towards and away from the closed position.

12. The apparatus according to claim 11, wherein the shield comprises a spherical segment that is located immediately downstream of the throttle body.

13. The apparatus according to claim 12, wherein the throttle plate is pivotable through ninety degrees of motion and wherein the restrictor device prevents the airflow through the through-bore throughout the ninety degrees of motion.

14. The apparatus according to claim 13, wherein the plate is fastened to one of the intake manifold and the throttle body by a fastener.

\* \* \* \* \*